(12) United States Patent
Johannsen

(10) Patent No.: US 10,407,115 B2
(45) Date of Patent: Sep. 10, 2019

(54) MASTER TRACK LINK HAVING GAPPED TEETH

(71) Applicant: Caterpillar Inc., Peoria, IL (US)

(72) Inventor: Eric James Johannsen, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 146 days.

(21) Appl. No.: 15/680,705

(22) Filed: Aug. 18, 2017

(65) Prior Publication Data

US 2019/0054964 A1 Feb. 21, 2019

(51) Int. Cl.
*B62D 55/21* (2006.01)
*B62D 55/32* (2006.01)

(52) U.S. Cl.
CPC ........... *B62D 55/213* (2013.01); *B62D 55/32* (2013.01)

(58) Field of Classification Search
CPC .............................. B62D 55/213; B62D 55/32
USPC ........ 305/186, 187, 188, 190, 191, 201, 204
See application file for complete search history.

(56) References Cited

U.S. PATENT DOCUMENTS

| | | | |
|---|---|---|---|
| 4,351,573 A | 9/1982 | Deere | |
| 4,361,364 A | 11/1982 | Viehmann | |
| 4,365,848 A * | 12/1982 | Grilli | B62D 55/213 305/186 |
| 4,457,565 A | 7/1984 | Bissi | |
| 4,579,394 A * | 4/1986 | Bedis | B62D 55/213 305/186 |
| 6,412,887 B1 | 7/2002 | Ketting et al. | |
| 6,976,742 B2 | 12/2005 | Girard et al. | |
| 7,877,977 B2 * | 2/2011 | Johannsen | B62D 55/213 305/186 |
| 8,671,539 B2 | 3/2014 | Cho | |
| 2008/0174175 A1 * | 7/2008 | Livesay | B62D 55/213 305/186 |
| 2011/0316331 A1 * | 12/2011 | Clarke | B62D 55/213 305/186 |
| 2017/0008578 A1 * | 1/2017 | Thorson | B62D 55/088 |

FOREIGN PATENT DOCUMENTS

| | | |
|---|---|---|
| DE | 2038144 | 2/1972 |
| GB | 1222602 | 2/1971 |
| WO | 2012067383 | 5/2012 |

* cited by examiner

*Primary Examiner* — S. Joseph Morano
*Assistant Examiner* — Jean W Charleston
(74) *Attorney, Agent, or Firm* — Law Office of Kurt J. Fugman LLC

(57) ABSTRACT

A track chain assembly comprises a plurality of track links connected to each other by either a track pin or a track bushing, a first master track link including a first interface region including a plurality of teeth, a second master track link including a second interface region including a plurality of teeth, and the first interface region and the second interface region are configured such that the plurality of teeth of both the first master track link and second master track link are configured to share substantially the same load when the track chain assembly is in use.

17 Claims, 4 Drawing Sheets

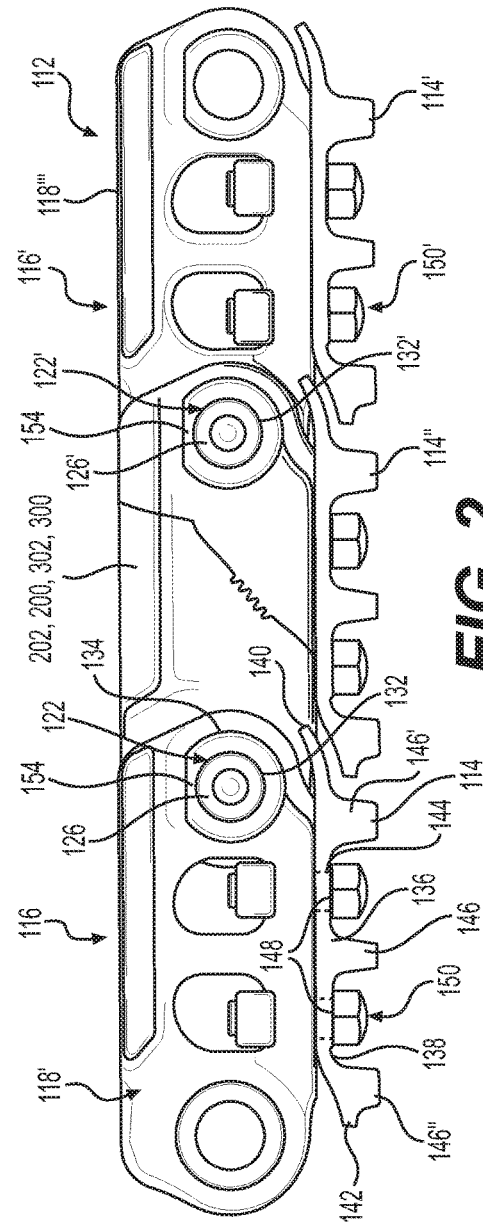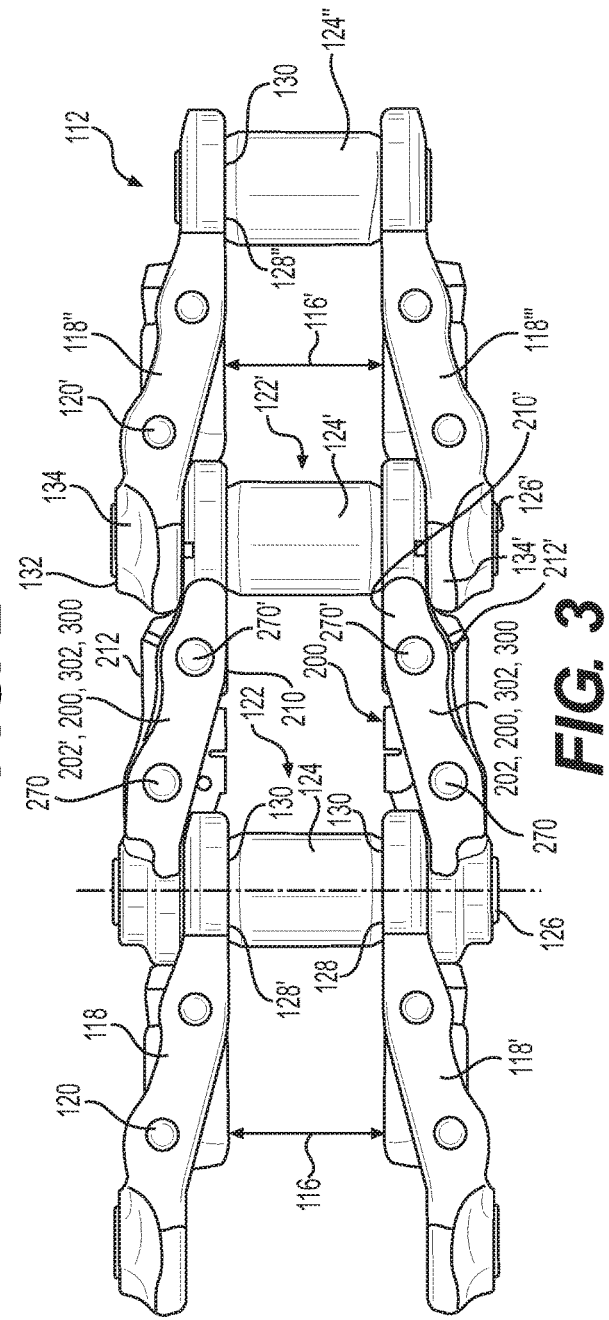

MASTER TRACK LINK HAVING GAPPED TEETH

TECHNICAL FIELD

The present disclosure relates to a method and apparatus for a master track link used for completing a track chain assembly of an endless undercarriage drive employed by earth moving, construction and mining equipment and the like. Specifically, the present disclosure relates to a master track link that has one or more teeth with a gap between them.

BACKGROUND

Earth moving, construction and mining equipment and the like are often used in rough, off-road terrain. These machines often employ an endless drive with track shoes that is better able to propel the machines in such environments over obstacles and uneven terrain, etc. The track chains, which include shoes, are held together by a series of interconnected track links, pins and bushings that are supported on the drive sprocket, idler and support rollers of the machine. As can be imagined, a device is typically provided that allows the track chain to be routed about the drive sprocket, idler and support rollers before the free ends of the chain are joined together. This device is called a "master link".

Also, depending on the weight of the machine, the size of the chain, the environment in which the machine operates, and other factors, the chains and/or track shoes may wear or be damaged and may require periodic inspection, servicing, repair, and/or replacement. Hence, a master link may also be provided in the chain to allow disassembly of the chain (i.e., separation of two ends of the chain).

As can be imagined, it is desirable for master track links to have at least three traits. First, it is desirable that the master track links be reliable or durable. That is to say, the master track link should not be prone to unintentional disassembly when a track chain is in use. If this happens, the track chain assembly may fall off the undercarriage of the machine, leading to unwanted downtime and maintenance of the machine to get the machine up and running again. Second, it is desirable that the master track link be able to be easily serviceable. That is to say, it should not be time consuming to detach the master track link so that maintenance as described above can be performed. Third, it is desirable to be able to cost effectively manufacture the master track link.

Some master track link designs in current applications experience problems with the teeth such that the teeth of one master track link do not durably mate with the teeth of the mating master track link. Thus, the master track links may become separated over time, leading to a problem with the track chain falling off the undercarriage of the machine, necessitating that the machine be serviced. This may lead to unwanted downtime for the machine and an associated economic loss for the business endeavor using the machine (e.g. mining, construction, earth moving, agriculture, etc.)

Accordingly, a need exists for a method and apparatus related to a master track link that can provide a better combination of serviceability, durability or reliability and cost.

One prior master track link using five teeth that mates with five teeth of a similarly configured master track link is disclosed in U.S. Pat. No. 8,671,539 to Cho. FIG. 1 of Cho shows that the five teeth of one master track link mate closely with five teeth of another master track link. More specifically, it discloses that the front inclined surfaces of each of the five teeth mate or contact the corresponding front inclined surfaces of the five teeth of the other master track link when the pair of master track links are loaded in tension in use to complete a complete track chain.

At the same time, the top surface of the teeth and back inclined surface of the teeth do not contact the corresponding features of the teeth of the other master track link. That is to say, gaps are formed between the top surface of a tooth on one master track link and the valley located between adjacent teeth on the other master track link as well as between the rear inclined surfaces of the teeth of both master track links. As alluded to earlier, this design has not been as durable as desired. Over time, the teeth do not always remain engaged, resulting in the track chain falling off the undercarriage of the machine. Therefore, a master track link that is more durable or reliable, and that can be retrofitted with track chain assemblies already in the field is still warranted.

SUMMARY

A pair of master track links according to an embodiment of the present disclosure is provided comprising a first master track including a first body defining a top surface, a bottom surface, a first side surface and a second side surface defining a thickness therebetween. The first body further defines a proximate end, a distal end, and a first bore adjacent the proximate end. The first body includes a first interface region including a front tooth disposed adjacent the proximate end, a rear tooth disposed adjacent the distal end, and at least one intermediate tooth disposed between the front tooth and the rear tooth. The front tooth is spaced away a first minimum distance from at least one intermediate tooth and the rear tooth is spaced away from at least one intermediate tooth a second minimum distance that is different than the first minimum distance.

A pair of master track links according to an embodiment of the present disclosure is provided comprising a first master track link including a first body defining a top surface, a bottom surface, a first side surface and a second side surface defining a thickness therebetween. The first body further defines a proximate end, a distal end, and a first bore adjacent the proximate end. The first body includes a first interface region including a front tooth disposed adjacent the proximate end, a rear tooth disposed adjacent the distal end, and at least one intermediate tooth disposed between the front tooth and the rear tooth. The front tooth includes a root and defines a height and the front tooth is defined by a void that extends past the root of the front tooth along a direction that is parallel to the height of the tooth.

A track chain assembly according to an embodiment of the present disclosure is provided comprising a plurality of track pins and track bushings disposed about the track pins, a plurality of track links that are connected to each other by either a track pin or a track bushing, wherein at least one track link defines a plurality of apertures for receiving a track pin or bushing, a plurality of track fasteners, a plurality of track shoes attached to the track links via the track fasteners, and a first master track link defining a first bore configured to receive a bushing or a pin and including a first interface region including a plurality of teeth, and a second master track link defining a first bore configured to receive a bushing or a pin and including a second interface region including a plurality of teeth. The first interface region and the second interface region are configured such that the plurality of teeth of both the first master track link and second master track link are configured to share substantially the same load when the track chain assembly is in use.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 2 is a side-view of a track chain assembly of the machine of FIG. 1 removed from the machine.

FIG. 3 is a bottom-view illustration of the track chain assembly of FIG. 2.

DETAILED DESCRIPTION

Figure 1:
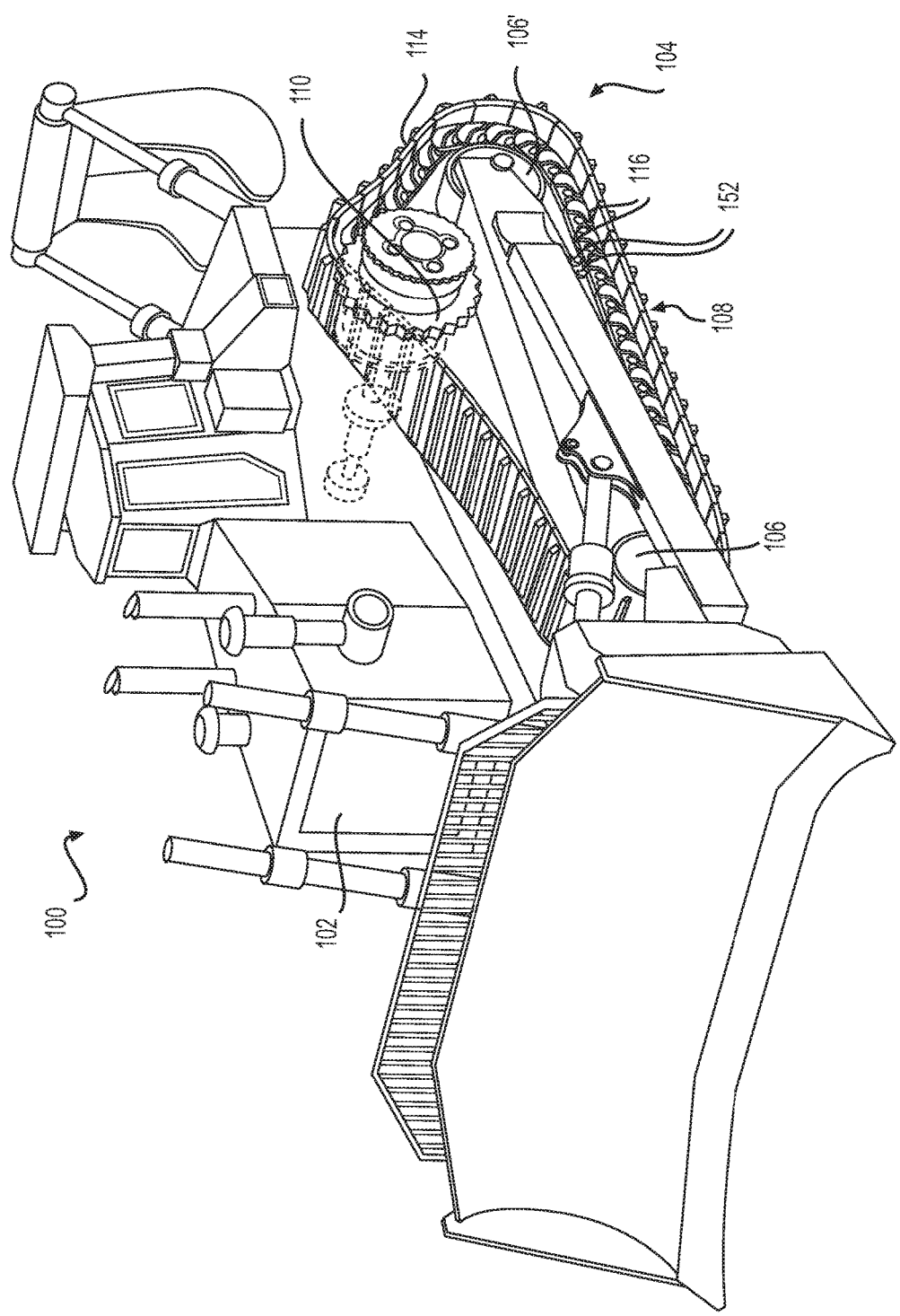
FIG. 1 is a side-view of a machine that may use various track chain assemblies with a master track link according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method for creating a track chain assembly using a master track link will now be described. In some embodiments, the master track link is an offset link that may be used with track chain assemblies already in the field. In other embodiments, the master track link may be a straight link, etc.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known in the art.

Undercarriage assembly 104 may include two separate continuous tracks 108, one on either side of machine 100 (only one of which is shown in FIG. 1). Each track 108 may be driven by power source 102 via one or more drive sprockets 110. In addition, each track 108 may include a chain 112 and a plurality of track shoes 114, each configured to selectively engage a surface, e.g., the ground. Each chain 112 may include a plurality of link subassemblies 116 and a master link subassembly 200. Support rollers 152 are also provided at the bottom of the track to support the chain.

FIGS. 2 and 3 respectively illustrate side-view and bottom-view perspectives of an exemplary chain assembly 112 and, specifically, a plurality of exemplary link subassemblies 116 and a master link subassembly 200, 300. Each one of link subassemblies 116 may include a respective pair of offset link members 118 or a respective pair of inner and outer links when straight links are used (not shown). Each offset link member 118 may include fastener holes 120, e.g., a threaded hole, configured to receive a fastener 150, e. g., a bolt, or cap screw, to attach a track shoe 114 to a given one of link subassemblies 116. Master link assembly 200 may include a pair of master track links 202 including a first master track link 202 and a second master track link 202'. The master track link subassembly 200 may be used to complete the chains assembly 112 in a manner that will be further described below with reference to FIG. 4 later herein.

Adjacent ones of link subassemblies 116 may be interconnected by way of rod assemblies 122 in the form of pins or bushings. More specifically, each rod assembly 122 may include a substantially cylindrical bushing 124 disposed about a substantially cylindrical pin 126. A pair of bearings (not shown) that are freely rotatable relative to pin 126, and a pair of seals (not shown) may also be provided in the rod assembly or in one of the link members proximate the rod assembly to prevent the loss of lubrication and provide freedom of movement.

In some embodiments, the bearings and seals may be combined functionally in the same assembly. The bushing 124 may be pressed into an aperture 128 of one end 130 of the offset link member 118 and the pin 126 may extend through this end 130 of the offset link member 118 and be received in the aperture 132 of other end 134 of the adjacent offset link member 118'. The pin 126 may be retained in the other end 134 of the adjacent offset link member 118' by being pressed into that link member 118' or be retained therein using a cotter pin or another similar device when a slip fit is being used. Other configurations and methods of assembling the link subassemblies 116 may be provided to create a track chain assembly 112. For example, a pin 126 or bushing 124 may be retained by swaging a boss 154 of a link 118, etc. Of course, a plurality of offset link members 118 are connected in a manner similar to what has just been described to form the track chain assembly 112.

More particularly, the first and second rod assemblies 122 may interface with apertures 128, 132 of adjacent offset link members 118, 118' such that consecutively connected link subassemblies 116 may be pivotally interconnected to one another to form the track chain assembly 112. For example, the outer end 134 of one offset link member 118' may mate in fixed manner with the pin 126 (such as when a press fit is employed) and house the seals and/or bearings assemblies while the inner end 130 of the adjacent offset link member 118 may mate with the bushing 124 in a fixed manner (such as when a press fit if employed). At the same time, the pin 126 may be free to rotate within the bushing 124 such as when some clearance is provided between the pin and the bore of the bushing. Consequently, a pair of adjacent offset link members 118 may be configured to pivot with respect to one another to form an articulating track chain assembly 112. Similarly, master track link subassembly 200 may be interconnected between two standard link subassemblies 116 by way of rod assemblies 122.

A track shoe 114 may be connected to each offset link member 118. Each track shoe 114 may include a base portion 136, a ground-engaging surface 138, a leading edge 140, and a trailing edge 142. Each track shoe 114 may also include opposing side edges 144 (only one of which shown in FIG. 2) disposed between leading edge 140 and trailing edge 142. One or more grousers or ribs 146 may be provided to engage the ground, improving traction. Additionally, each track shoe 114 may also include two pairs of threaded shoe holes 148, each pair disposed along a respective one of the side edges 144 and configured to align with a pair of fastener holes 120 associated with an offset link member 118. In some embodiments, holes 148 may be clearance holes and not be threaded.

Typically, each one of shoe holes 114 may correspond to an associated fastener receiving hole 120 situated on the bottom surface of each of the offset link members 118. As such, each track shoe 114 may respectively connect to a pair of opposing pair of offset link members 118 from one side of the track chain assembly to the other side of the track chain assembly shown in FIG. 3. Threaded fasteners 150, such as, for example, bolts or cap screws, may be respectively disposed in each one of shoe holes 148 and fastener receiving holes 120 to fasten a track shoe 114 to a respective pair of opposing offset link members 118. It is contemplated that the spacing of the fastener receiving holes 120 for each offset link member 118 may be substantially similar such that each track shoe 114 may be configured to be connectable to each of offset link members, assuming that each track shoe is also similarly or identically configured.

Figure 4:
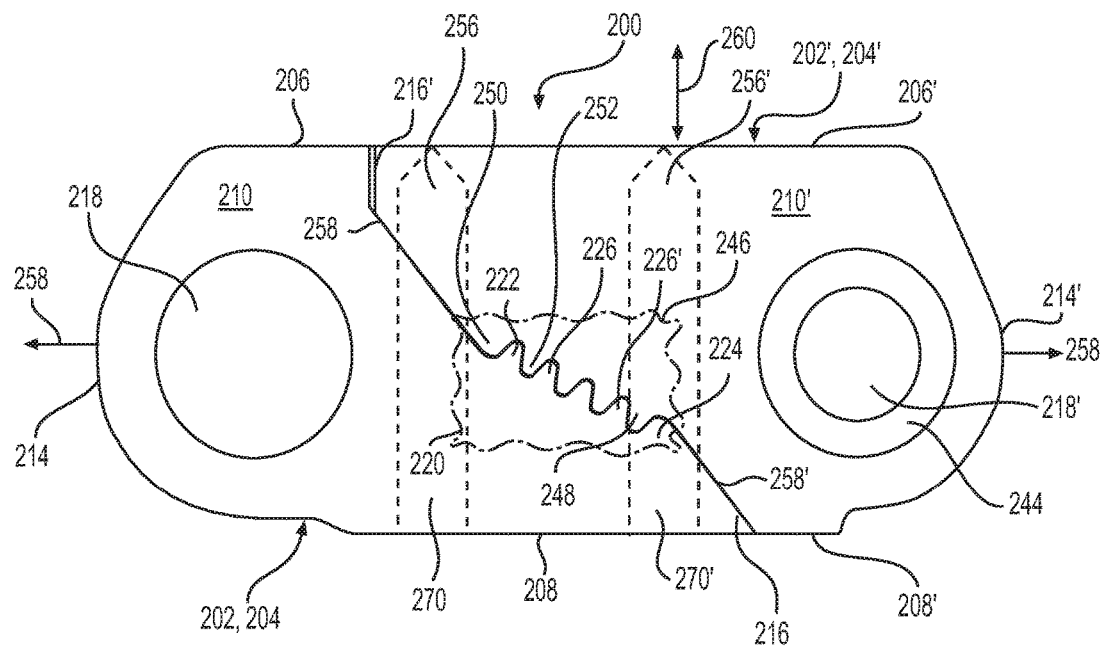
FIG. 4 is a side view of a pair of master track links mating with each other removed from the track chain assembly of FIG. 2.
Figure 5:
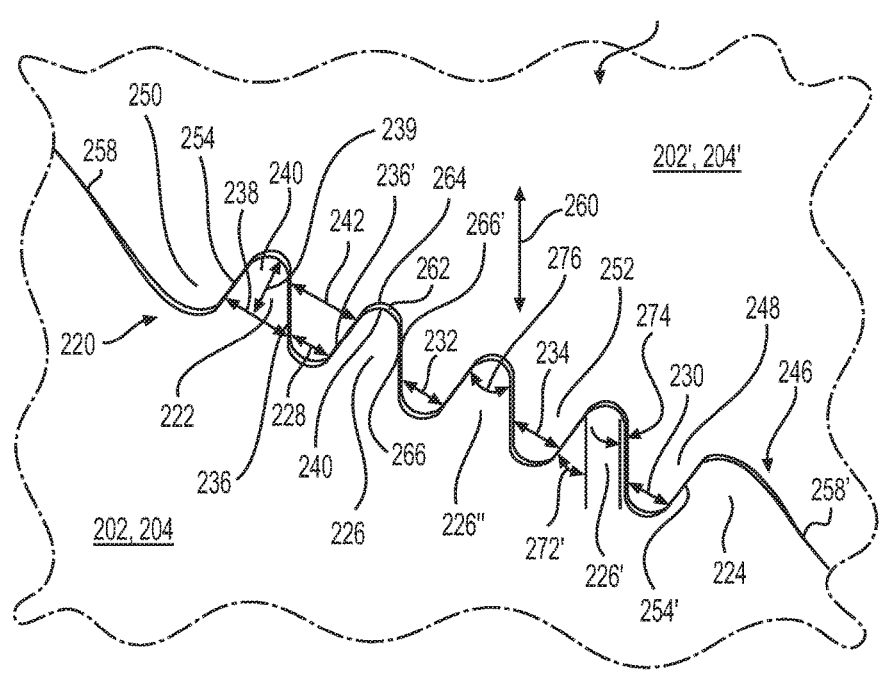
FIG. 5 is a detail view of the mating teeth of the master track links of FIG. 4.
Figure 6:
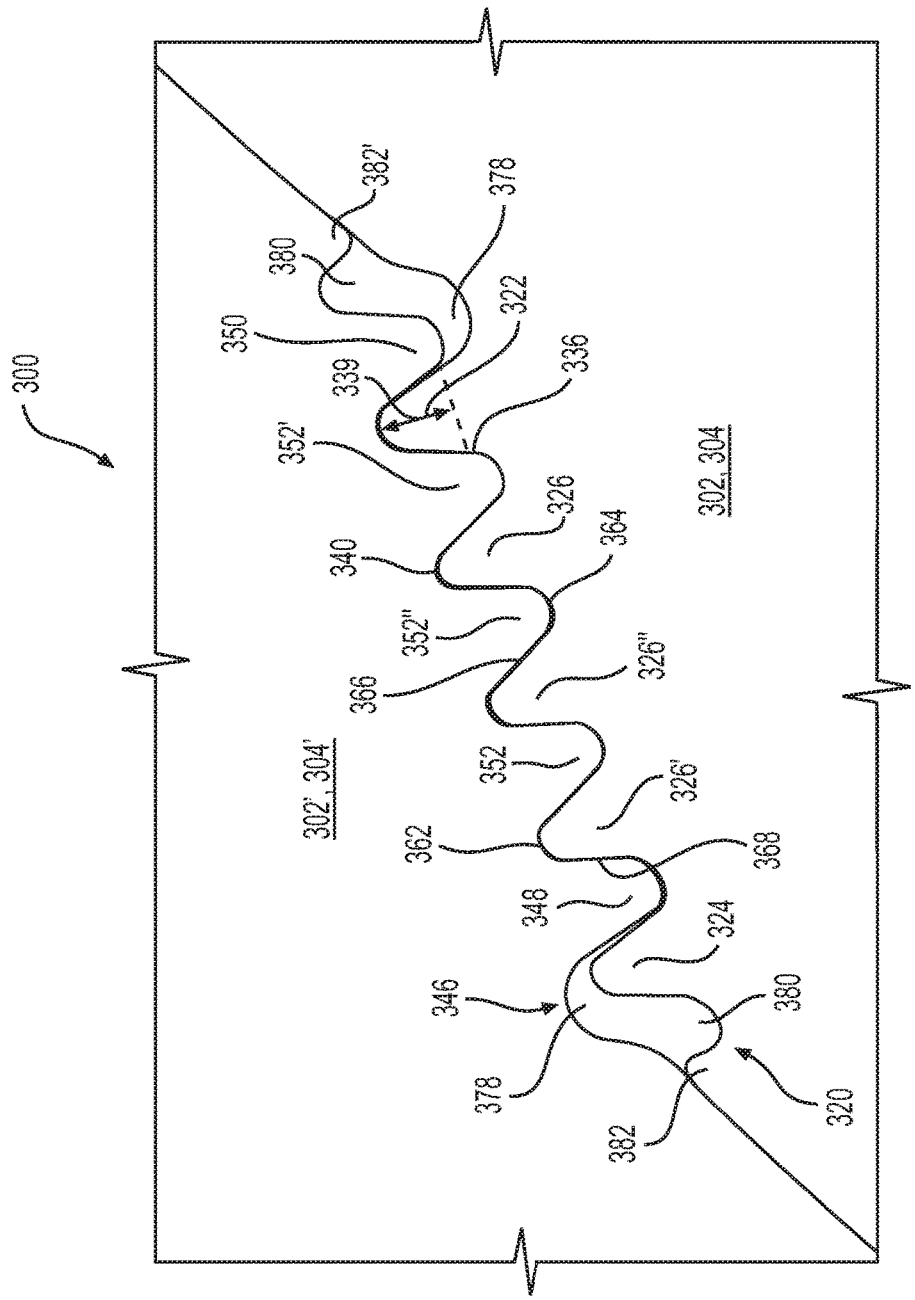
FIG. 6 is a detail view of the mating teeth of a pair of master track links according to another embodiment of the present disclosure using unsupported rear teeth and/or six teeth instead of five teeth.

Turning now to FIGS. 4 thru 6, master track link subassemblies 200, 300 according to various embodiments of the present disclosure are depicted. Focusing on FIGS. 4 and 5, a master track link subassembly 200 is shown using a five tooth configuration but other numbers and shapes of teeth are considered to be within the scope of the present disclosure. The first master track link 202 may comprise a first body 204 defining a top surface 206, a bottom surface 208, a first side surface 210 and a second side surface 212 (side surfaces both shown in FIG. 3) defining a thickness therebetween, a proximate end 214 and a distal end 216. The body 204 may also define a first bore 218 the proximate end 214. This bore 218 may extend from or be at least partially defined by either or both side surfaces 210, 212. As shown, the bore 218 is cylindrical and is a thru-bore but may have another suitable configuration.

In addition, the first body 204 includes a first interface region 220 including a front tooth 222 disposed adjacent the proximate end 214, a rear tooth 224 disposed adjacent the distal end 216, and at least one intermediate tooth 226 disposed between the front tooth 222 and the rear tooth 224. The front tooth 222 is spaced away a first minimum distance 228 from at least one intermediate tooth 226 and the rear tooth 224 is spaced away from at least one intermediate tooth 226 a second minimum distance 230 that is different than the first minimum distance 228.

More particularly, the first body 204 includes a first intermediate tooth 226 disposed proximate the front tooth 222, a second intermediate tooth 226' disposed proximate the rear tooth 224 and a third intermediate tooth 226" disposed between the first intermediate tooth 226 and the second intermediate tooth 226', creating the five tooth configuration for the first interface region 220 of the first master track link 202. The second minimum distance 230 is measured from the rear tooth 224 to the second intermediate tooth 226' and the first minimum distance 228 is measured from the first intermediate tooth 226 to the front tooth 222 for this particular embodiment.

Moreover, the third intermediate tooth 226" is spaced away from the first intermediate tooth 226 a third minimum distance 232, the third intermediate tooth 226" is spaced away from the second intermediate tooth 226' a fourth minimum distance 234 and the second minimum distance 230, third minimum distance 232 and fourth minimum distance 234 are approximately the same. On the other hand, the first minimum distance 228 from the front tooth 222 to the first intermediate tooth 226 is less than the second minimum distance 230, third minimum distance 232 and fourth minimum distance 234. In some embodiments, the value of the first minimum distance 228 may be approximately 5 mm while the value of the second minimum distance 230 may be approximately 5 mm. Also, the front tooth 222, the first intermediate tooth 226, the second intermediate tooth 226', and third intermediate tooth 226" may be similarly or identically configured. The various distances and configurations of the teeth may be varied as needed or desired in other embodiments. It should also be noted that these distances may be measured from the root 236 of one tooth 222, 224, 226, 226', 226" to the root 236 of an adjacent tooth 222, 224, 226, 226', 226".

As best seen in FIG. 5, the front tooth 222 includes a root 236 and the first body 204 defines a maximum distance 238 of the root of the front tooth that is approximately 11 mm. The front tooth 222 also defines a free end 240 and the first body 204 defines a height 239 of the front tooth 222 measured from the maximum distance 238 at the root 236 of the front tooth 222 to the free end 240 of the front tooth 222 along a direction perpendicular to the maximum distance 238. A ratio of the height 239 of the front tooth 222 to the maximum distance 238 at the root 236 of the front tooth 222 ranges from 0.7 to 0.9. The maximum distance 238 at the root 236 of the front tooth 222 that is less than the first maximum distance 242 that the front tooth 222 is spaced away from the first intermediate tooth 226. The relevance of these various dimensions will be explained shortly.

Returning to FIG. 4, a second master track link 202' is provided that may mate with the first master track link 202. The second master track link 202' may include a second body 204' defining a top surface 206', a bottom surface 208', a first side surface 210' and a second side surface 212' defining a thickness therebetween, a proximate end 214' and a distal end 216'. Also, the second body 204' defines a first bore 218' adjacent the proximate end 214 having a step or counterbore 244. The configuration of this first bore 218' of the second body 204' may be varied as needed or desired. The second body 204' includes a second interface region 246 including a front tooth 248 disposed adjacent the proximate end 214', a rear tooth 250 disposed adjacent the distal end 216', and at least one intermediate tooth 252 disposed between the front tooth 248 and the rear tooth 250. The second interface region 246 is similarly or identically configured to the first interface region 220 of the first master track link 202. Put another way, the first interface region 220 and the second interface region 246 may be at least partially mirror images of each other.

The first master track link 202 and second master track link 202' are configured to mate with the first and second interface regions 220, 246 contacting each other such that the front tooth 222 of first master track link 202 does not contact the rear tooth 250 of the second master track link 202' and the front tooth 248 of the second master track link 202' does not contact the rear tooth 224 of the first master track link 202 before the first and second master track links 202, 202' are fastened together. In other words, a nominal gap 254, 254' having a value of 2-15 microns may be present between the front tooth 222, 248 and the rear tooth 224, 250. Then, the track shoe (see 114 in FIG. 2) may be attached to the second master track link 202' as the fasteners (see 150 in FIG. 2) will engage the threaded holes 256 of the second master track link 202' passing through clearance holes 270 of the first master track link 202. This will cause the first and second master track links 202, 202' to approach each other along ramp portions 258 of the first and second interface regions 220, 246 until the teeth 222, 224, 226, 248, 250, 252 touch, locking the first and second master track links 202, 202' together along a the direction of tension 258 of the track chain assembly (see 112 in FIGS. 1 thru 3) in the use. This tension direction 258 may be perpendicular to the vertical direction 260, which is the direction along which the first and second master track links 202, 202' may be initially assembled. A clearance gap 262 is also present between the free end 240 of each tooth and the valley 264 between each tooth as well as between the rear inclined surfaces 266 of the teeth. The minimum distance of the clearance gap 262 may be approximately 0.8 mm, measured normal to a tooth surface.

As a result, the load borne by each tooth 222, 224, 226, 248, 250, 252 may be better equilibrated, such that the load borne by each tooth is within 5%, and more preferably, within 2% of each other.

Returning to FIG. 5, the tooth profile is designed so that the front inclined surfaces 266 form a greater angle 272 relative to the vertical direction 260 (having a value of approximately 35 degrees) while rear inclined surfaces 268 form a greater angle 274 form the vertical direction 260 (having an angle of approximately 0 to 5 degrees). So, the front inclined surfaces 268 of the teeth 222, 224, 226, 248, 250, 252 are not prone to slipping while the rear inclined surfaces 268 are designed to allow the first and second master track links 202, 202' to be easily disassembled. The included angle 276 of the tooth 222, 224, 226, 248, 250, 252 as shown may be 35 degrees. These angles may be varied as needed or desired in other embodiments.

Looking now at FIG. 6, an alternate configuration of the mating teeth according to another embodiment of a master track link subassembly 300 of the present disclosure is illustrated. It is to be understood that the first and second interface regions 220, 246 of the first and second master links 202, 202' of FIG. 4 may be substituted with the first and second interface regions 320, 346 of the first and second master track links 302, 302' shown by FIG. 6. The first master track link 302 may include a first body 304 including a first interface region 320 including a front tooth 322 disposed adjacent the proximate end (see 214 of FIG. 4), a rear tooth 324 disposed adjacent the distal end (see 216 of FIG. 4), and at least one intermediate tooth 326 disposed between the front tooth 322 and the rear tooth 324, and the front tooth 322 includes a root 336 and defines a height 339 and the front tooth 322 is defined by a void 378 that extends past the root 336 of the front tooth 322 along a direction that is parallel to the height 339 of the tooth 322. The volume of this void 378 is greater than the clearance gap 262 discussed herein and may be at least two to three times greater or more in some embodiments.

A second master track link 302' may also be provided that is similarly constructed as the first master track link 302. The second master track link 302' may include a second body 304' that includes a second interface region 346 including a front tooth 348 disposed adjacent the proximate end (see 214' of FIG. 4), a rear tooth 350 disposed adjacent the distal end (see 216' of FIG. 4), and at least one intermediate tooth 326 disposed between the front tooth 348 and the rear tooth 350, and the front tooth 348 includes a root 336' and defines a height 339' and the front tooth 348 is defined by a void 378' that extends past the root 336' of the front tooth 348 along a direction that is parallel to the height 339' of the tooth 348.

The rear tooth 324 of the first master track link 302 is unsupported being positioned adjacent the void 378 disposed proximate the front tooth 348 of the second master track link 302' and the rear tooth 350 of the second master track link 302' is unsupported being positioned adjacent the void 378' disposed proximate the front tooth 322 of the first master track link 302' when the first interface region 320 of the first master track link 302 is mated with the second interface region 346 of the second master track link 302' in a manner as previously described herein.

For the embodiment shown in FIG. 6, both the first and second master track links 302, 302' include at least three intermediate teeth 326, 352 disposed between the front tooth 322, 348 and the rear tooth 324, 350 and the rear tooth 324 of the first master track link 302 is defined by an auxiliary void 380 and the rear tooth 350 of the second master track link is defined by an auxiliary void 380' when the first interface region 320 of the first master track link 302 is mated with the second interface region 346 of the second master track link 302'. Void 380 is at least as large as void 378 and may subsume void 378 or be in communication therewith when the first and second master links 302, 302' are mated. The effect of these voids 378, 380 is that the rear tooth 324, 350 is more flexible, reducing the load that the rear tooth 324, 350 and the front tooth 322, 348 bears, helping to equilibrate the forces borne by each tooth 322, 324, 326, 348, 350, 352 in a manner as previously described herein.

Each tooth defines a front inclined surface 366 and a rear inclined surface 368 and the intermediate teeth 326 of the first master track link 302 forms a clearance gap 362 with the mating intermediate teeth 352 of the second master track link 302' such that the rear inclined surfaces 368 of the intermediate teeth 326 of the first master track link 302 do not contact the rear inclined surfaces 368 of the intermediate teeth 352 of the second master track link 302. This gap 362 also extends between the free end 340 of each tooth and the corresponding valley 364 on the opposite master track link 302, 302' and may have the same configuration as described above with reference to FIG. 4.

The first master track link 302 includes a six tooth 382 that is smaller than the front tooth 322, rear tooth 324 and the intermediate teeth 326 of the first master track link 302 and the six tooth 382 is positioned proximate the auxiliary void 380 of the first master track link 302. Similarly, the second master track link 302' includes a six tooth 382' that is smaller than the front tooth 348, rear tooth 350 and the intermediate teeth 352 of the second master track link 302' and the six tooth 382' of the second master track link 302' is positioned proximate the auxiliary void 380' of the second master track link 302'.

As mentioned previously, the first interface region 320 of the first master track link 302 and the second interface region 346 of the second master track link 302' are similarly or identically configured. In particular, the teeth 322, 324, 326, 382 shown in FIG. 6 of one master track link 302 is a mirror image of the teeth 348, 350, 352, 382' of the other master track link 302'.

For any of the embodiments discussed herein, when the desired length of the chain assembly has been achieved, the distal end 216 of a pair of opposing master track link members 202, 302 are attached to pair of opposing free ends of the chain 112. Then, once the chain assembly 112 has been routed about the drive sprockets 110, idler wheels 106, rollers, etc. of the undercarriage 104, the chain 112 is completed by forming a master track link subassembly 200, 300 using a fastener 150 as previously described.

Also, any of the threaded holes 256 may be at least partially defined by hardened material that forms the rail portions of the links 202, 302, providing suitable support for the weight of the machine and its payload.

INDUSTRIAL APPLICABILITY

In practice, a master track link, a pair of master track links, a chain using a master track link or a pair of track links, or a pair of master track link subassemblies according to any embodiment described herein may be sold, bought, manufactured or otherwise obtained in an OEM or aftermarket context.

A master track link 202, 302 or master track link subassembly 200, 300 may be attached to the free end of a chain assembly 112 at the factory and sold as a replacement part or already installed on a machine such as shown and described previously with respect to FIG. 1. Completing the chain assembly 112 simply requires the user to align the master track links 202, 302 and fastening them together.

The chain assembly 112 as a whole may be described as follows in reference to FIGS. 1-6. The track chain assembly 112 may comprise a plurality of track pins 126 and track bushings 124 disposed about the track pins 126, and a plurality of track links 118 that are connected to each other by either a track pin 126 or a track bushing 124, wherein at least one track link 118 defines a plurality of apertures 128, 132 for receiving a track pin 126 or bushing 124. The chain assembly 112 would typically also include a plurality of track fasteners 150 and a plurality of track shoes 114 attached to the track links 118 via the track fasteners 150. Finally, at least one and typically two master track links 202, 302 are attached at each free end of the track chain assembly 112.

The master track link 202, 302 may include a body 204, 304 defining a top surface 206, a bottom surface 208, a first side surface 210 and a second side surface 212 defining a thickness therebetween, a proximate end 214 and a distal end 216. The body 204, 304 may also define a first bore 218 adjacent the proximate end 214.

More specifically, the first master track link 202, 302 defines a first bore 218 configured to receive a bushing 124 or a pin 126 and includes a first interface region 220, 320 including a plurality of teeth 222, 224, 226, 322, 324, 326 while the second master track link 202', 302' defines a first bore 218' configured to receive a bushing 124 or a pin 126 and includes a second interface region 246, 346 including a plurality of teeth 248, 250, 252, 348, 350, 352. The first interface region 220, 320 and the second interface region 246, 346 are configured such that the plurality of teeth of both the first master track link 202, 302 and second master track link 202', 302' are configured to share substantially the same load when the track chain assembly is in use. For example, the load from tooth to tooth may be within at least 5%, and more preferably, within 2% of each other.

As shown in FIGS. 4 and 5, the first master track link 202 may include a front tooth 222 and the second master track link 202' may include a rear tooth 250 and the front tooth 222 of the first master track link 202 is configured not to contact the rear tooth 250 of the second master track link 202' before the first master track link 202 is fastened to the second master track link 202'.

As shown in FIG. 6, the first master track link 302 may include a front tooth 322 and the second master track link 302' may include a rear tooth 350 that includes a root 336 and defines a height 339 and the rear tooth 350 is defined by a void 378 that extends past the root 336 of the rear tooth 350 such that the rear tooth 350 is configured to be unsupported when the front tooth 322 of the first master track link 302 contacts rear tooth 350.

In either scenario, the plurality of teeth 322, 324, 326 of the first interface region 320 and the plurality of teeth 348, 350, 352 of the second interface region 346 may be mirror images of each other. As a result of the chosen suitable configuration, the load borne by the teeth of any embodiment discussed herein may be substantially the same as the load borne by another tooth.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A pair of master track links comprising:
    a first master track link including
        a first body defining a top surface, a bottom surface, a first side surface and a second side surface defining a thickness therebetween, a proximate end and a distal end; wherein
        the first body defines a first bore adjacent the proximate end;
        the first body includes a first interface region including a front tooth disposed adjacent the proximate end, a rear tooth disposed adjacent the distal end, and at least one intermediate tooth disposed between the front tooth and the rear tooth; and
        the front tooth is spaced away a first minimum distance from said at least one intermediate tooth and the rear tooth is spaced away from said at least one intermediate tooth a second minimum distance that is different than the first minimum distance.

2. The pair of master track links of claim 1 wherein said at least one intermediate tooth includes a first intermediate tooth disposed proximate the front tooth, a second intermediate tooth disposed proximate the rear tooth and a third intermediate tooth disposed between the first intermediate tooth and the second intermediate tooth, wherein the second minimum distance is measured from the rear tooth to the second intermediate tooth and the first minimum distance is measured from the first intermediate tooth to the front tooth.

3. The pair of master track links of claim 2 wherein the third intermediate tooth is spaced away from the first intermediate tooth a third minimum distance, the third intermediate tooth is spaced away from the second intermediate tooth a fourth minimum distance and the second minimum distance, third minimum distance and fourth minimum distance are approximately the same.

4. The pair of master track links of claim 3 wherein the first minimum distance is less than the second minimum distance.

5. The pair of master track links of claim 4 wherein the first minimum distance is approximately 5 mm and the second minimum distance is approximately 5 mm.

6. The pair of master track links of claim 4 wherein the front tooth includes a root and the first body defines a maximum distance of the root of the front tooth that is approximately 11 mm.

7. The pair of master track links of claim 6 wherein the front tooth defines a free end and the first body defines a height of the front tooth measured from the maximum distance at the root of the front tooth to the free end of the front tooth along a direction perpendicular to the maximum distance and a ratio of the height of the front tooth to the maximum distance at the root of the front tooth ranges from 0.7 to 0.9.

8. The pair of master track links of claim 6 wherein the maximum distance at the root of the front tooth that is less than the maximum distance that the front tooth is spaced away from the first intermediate tooth, and further comprising:
   a second master track link including
      a second body defining a top surface, a bottom surface, a first side surface and a second side surface defining a thickness therebetween, a proximate end and a distal end; wherein
      the second body defines a first bore adjacent the proximate end;
      the second body includes a second interface region including a front tooth disposed adjacent the proximate end, a rear tooth disposed adjacent the distal end, and at least one intermediate tooth disposed between the front tooth and the rear tooth; and
   the first master track link and second master track link are configured to mate with the first and second interface regions contacting each other such that the front tooth of first master track link does not contact the rear tooth of the second master track link and the front tooth of the second master track link does not contact the rear tooth of the first master track link before the first and second master track links are fastened together.

9. A pair of master track links comprising:
   a first master track link including
      a first body defining a top surface, a bottom surface, a first side surface and a second side surface defining a thickness therebetween, a proximate end and a distal end; wherein
      the first body defines a first bore adjacent the proximate end;
      the first body includes a first interface region including a front tooth disposed adjacent the proximate end, a rear tooth disposed adjacent the distal end, and at least one intermediate tooth disposed between the front tooth and the rear tooth; and
      the front tooth includes a root and defines a height and the front tooth is defined by a void that extends past the root of the front tooth along a direction that is parallel to the height of the front tooth
   a second master track link including
      a second body defining a top surface, a bottom surface, a first side surface and a second side surface defining a thickness therebetween, a proximate end and a distal end; wherein
      the second body defines a first bore adjacent the proximate end;
      the second body includes a second interface region including a front tooth disposed adjacent the proximate end, a rear tooth disposed adjacent the distal end, and at least one intermediate tooth disposed between the front tooth and the rear tooth; and
      the front tooth includes a root and defines a height and the front tooth is defined by a void that extends past the root of the front tooth along a direction that is parallel to the height of the front tooth;
   wherein the rear tooth of the first master track link is unsupported being positioned adjacent the void disposed proximate the front tooth of the second master track link, the rear tooth of the second master track link is unsupported being positioned adjacent the void disposed proximate the front tooth of the first master track link when the first interface region of the first master track link is mated with the second interface region of the second master track link; and
   the at least one intermediate tooth of both the first and second master track links includes at least three intermediate teeth disposed between the front tooth and the rear tooth and the rear tooth of the first master track link is defined by an auxiliary void and the rear tooth of the second master track link is defined by an auxiliary void when the first interface region of the first master track link is mated with the second interface region of the second master track link.

10. The pair of master track links of claim 9 wherein each tooth defines a front inclined surface and a rear inclined surface and the intermediate teeth of the first master track link forms a gap with the mating intermediate teeth of the second master track link such that the rear inclined surfaces of the intermediate teeth of the first master track link do not contact the rear inclined surfaces of the intermediate teeth of the second master track link.

11. The pair of master track links of claim 10 wherein the first master track link includes a six tooth that is smaller than the intermediate teeth of the first master track link and the six tooth is positioned proximate the auxiliary void of the first master track link.

12. The pair of master track links of claim 11 wherein the second master track link includes a six tooth that is smaller than the front tooth, rear tooth and the intermediate teeth of the second master track link and the six tooth of the second master track link is positioned proximate the auxiliary void of the second master track link.

13. The pair of master track links of claim 12 wherein the first interface region of the first master track link and the second interface region of the second master track link are similarly configured.

14. A track chain assembly comprising:
a plurality of track pins and track bushings disposed about the track pins; and
a plurality of track links that are connected to each other by one of the plurality of track pins or track bushings, wherein at least one track link defines a plurality of apertures for receiving one of the plurality of track pins or bushings;
a plurality of track fasteners;
a plurality of track shoes attached to the track links via the track fasteners; and
a first master track link defining a first bore configured to receive one of the plurality of track pins or track bushings and including a first interface region including a plurality of teeth;
a second master track link defining a first bore configured to receive one of the plurality of track pins or track bushings and including a second interface region including a plurality of teeth; wherein
the first interface region and the second interface region are configured such that the plurality of teeth of both the first master track link and second master track link are configured to share substantially the same load when the track chain assembly is in use.

15. The track chain assembly of claim 14 wherein the first master track link includes a front tooth and the second master track link includes a rear tooth and the front tooth of the first master track link is configured not to contact the rear tooth of the second master track link before the first master track link is fastened to the second master track link.

16. The track chain assembly of claim 14 wherein the first master track link includes a front tooth and the second master track link includes a rear tooth that includes a root and defines a height and the rear tooth is defined by a void that extends past the root of the rear tooth such that the rear tooth is configured to be unsupported when the front tooth of the first master track link contacts the rear tooth.

17. The track chain assembly of claim 14 wherein the plurality of teeth of the first interface region and the plurality of teeth of the second interface region are mirror images of each other.

* * * * *